(12) United States Patent
Nevou et al.

(10) Patent No.: US 11,537,217 B2
(45) Date of Patent: Dec. 27, 2022

(54) DEVICE INCLUDING AN OPTOELECTRONIC MODULE OPERABLE TO RESPOND TO A USER'S FINGER MOVEMENTS FOR CONTROLLING THE DEVICE

(71) Applicant: ams Sensors Singapore Pte. Ltd., Singapore (SG)

(72) Inventors: Laurent Nevou, Zurich (CH); Markus Dantler, Thalwil (CH); Jens Geiger, Thalwil (CH)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/419,948

(22) PCT Filed: Jan. 28, 2020

(86) PCT No.: PCT/SG2020/050039
§ 371 (c)(1),
(2) Date: Jun. 30, 2021

(87) PCT Pub. No.: WO2020/159440
PCT Pub. Date: Aug. 6, 2020

(65) Prior Publication Data
US 2022/0066573 A1 Mar. 3, 2022

Related U.S. Application Data

(60) Provisional application No. 62/797,594, filed on Jan. 28, 2019.

(51) Int. Cl.
*G06F 3/03* (2006.01)
*G06F 3/16* (2006.01)
(Continued)

(52) U.S. Cl.
CPC .......... *G06F 3/0325* (2013.01); *G06F 3/0482* (2013.01); *G06F 3/0483* (2013.01); *G06F 3/0485* (2013.01); *G06F 3/165* (2013.01)

(58) Field of Classification Search
CPC .... G06F 3/0325; G06F 3/0482; G06F 3/0483; G06F 3/0485; G06F 3/017;
(Continued)

(56) References Cited

U.S. PATENT DOCUMENTS 7,971,156 B2 * 6/2011 Albertson ............... H04L 63/08
715/863
8,304,733 B2 * 11/2012 Alameh ................ G06F 3/0325
250/349

(Continued)

FOREIGN PATENT DOCUMENTS

EP 2 328 066 A1 6/2011

OTHER PUBLICATIONS

International Search Report with Written Opinion for related Application No. PCT/SG2020/050039 dated Mar. 30, 2021 (11 Pages).

*Primary Examiner* — Vijay Shankar
(74) *Attorney, Agent, or Firm* — Viering, Jentschura & Partner Mbb

(57) ABSTRACT

Techniques are described for use with a wide range of consumer and other electronic devices to facilitate a user's control of such features as volume, as well as song, channel or page selection, depending on the application. A method includes emitting light out of a module, receiving signals from light detectors in the module, wherein the signals represent, at least in part, light reflected by a person's finger or other object passing in front of the light detectors, detecting movement of the person's finger or other object based on the received signals, and controlling a feature of a device in response to the detected movement.

20 Claims, 7 Drawing Sheets

(51) Int. Cl.
*G06F 3/0482* (2013.01)
*G06F 3/0483* (2013.01)
*G06F 3/0485* (2022.01)

(58) Field of Classification Search
CPC ...... G06F 3/03547; G06F 3/042; G06F 3/165; G06F 2203/0339
See application file for complete search history.

(56) References Cited

U.S. PATENT DOCUMENTS

| | | | |
|---|---|---|---|
| 8,542,186 B2* | 9/2013 | Alameh | H04W 8/22 |
| | | | 324/115 |
| 8,619,029 B2* | 12/2013 | Alameh | G06F 3/017 |
| | | | 398/115 |
| 9,820,355 B2* | 11/2017 | Jia | G01J 1/0242 |
| 2002/0061217 A1* | 5/2002 | Hillman | G06F 3/0202 |
| | | | 400/489 |
| 2012/0138771 A1 | 6/2012 | Li et al. | |
| 2014/0078318 A1 | 3/2014 | Alameh | |

\* cited by examiner

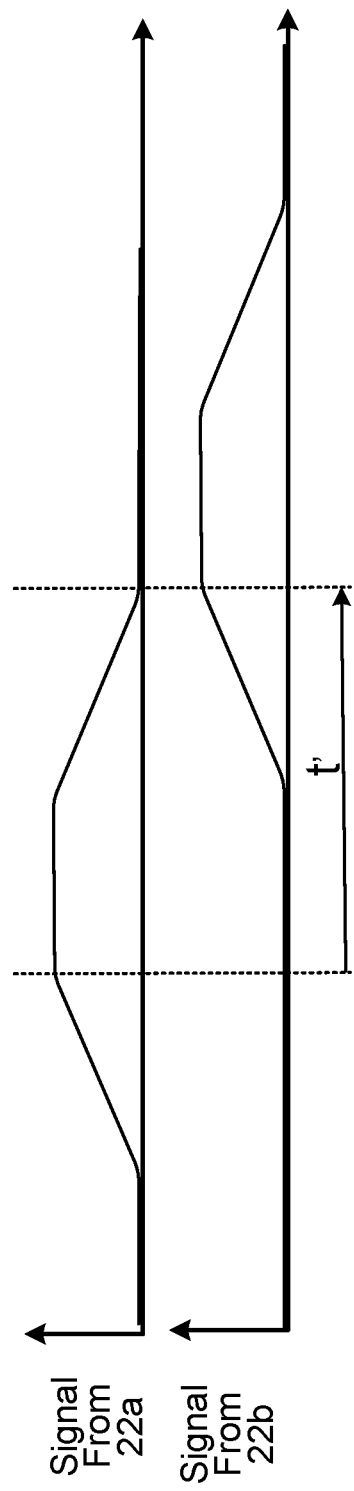
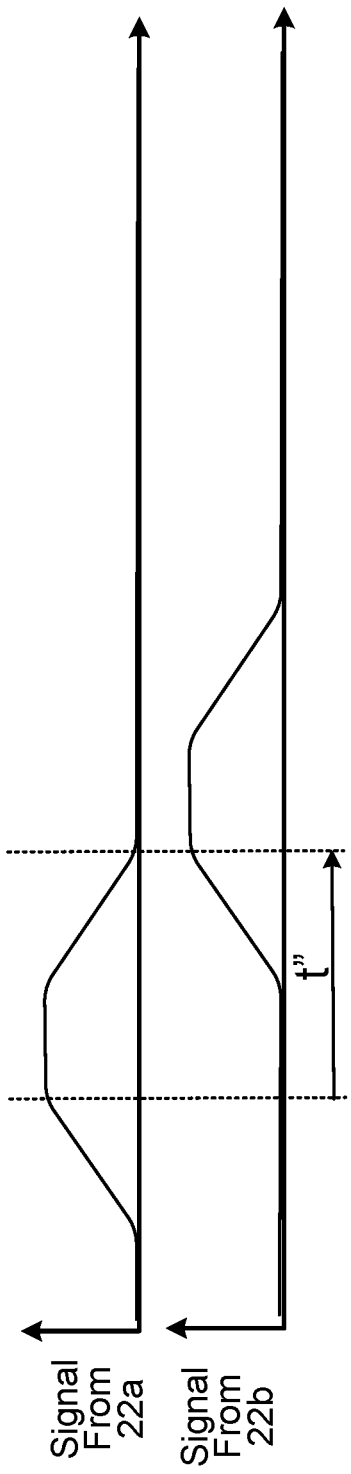

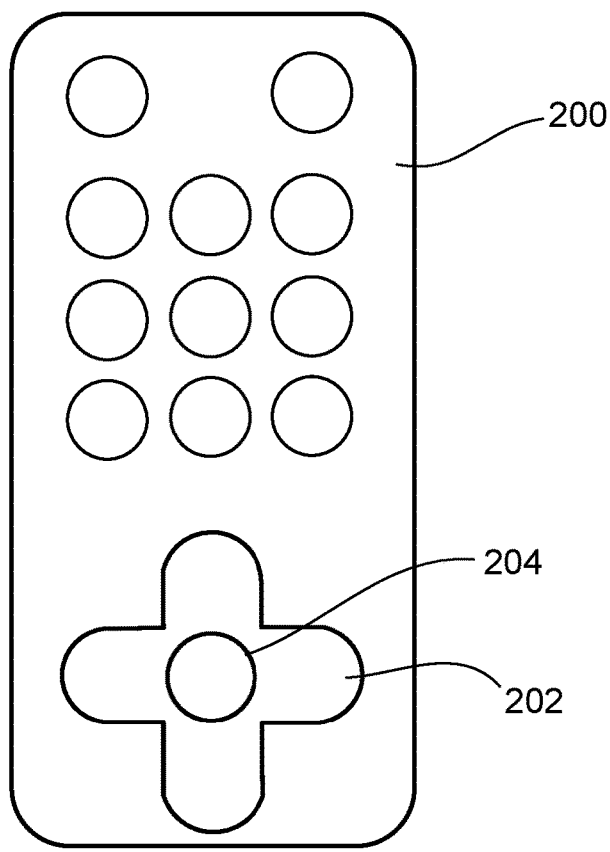
FIG. 12A
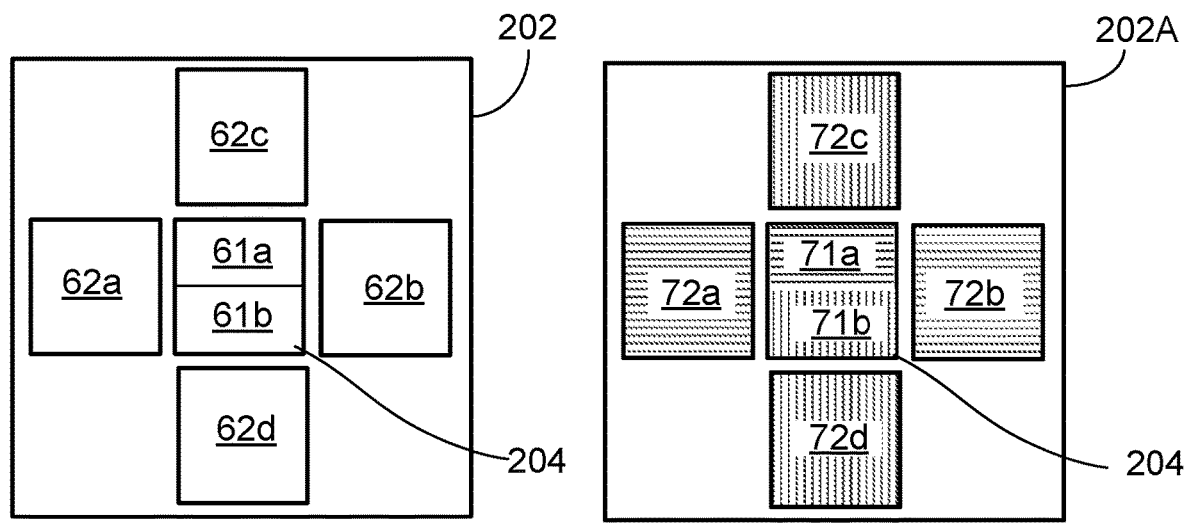
FIG. 12B    FIG. 12C

DEVICE INCLUDING AN OPTOELECTRONIC MODULE OPERABLE TO RESPOND TO A USER'S FINGER MOVEMENTS FOR CONTROLLING THE DEVICE

FIELD OF DISCLOSURE

The present disclosure relates to devices that include an optoelectronic module operable to respond to a user's manual movements for controlling the device.

BACKGROUND

Many consumer electronic devices, such as mobile phones, radios, tablet computers and tv remote controllers, include mechanical buttons or other interfaces that allow a user to control various features of the user's experience (e.g. volume control; channel selection). Thus, volume control can be used, for example, to adjust the sound level of a mobile phone. In some cases, volume control is based on mechanical push-buttons that a user can use to increase or decrease the volume of the sound. Likewise, tv remote controls sometimes include mechanical push buttons that can be used for volume control and channel selection.

The integration of mechanical control buttons into an electronic device and into the housing for the device can be highly complicated and, particularly in very small devices, carries additional quality risks. The mechanical buttons typically require a lot of space, which is at a premium in compact devices such smart phones. Further, the presence of openings required in the housing for the mechanical push buttons make dust and water protection challenging. Such issues can addressed, for example, by additional sealing or protection parts, but these features add complexity and costs to the device. Further, the lifetime of such mechanical push-button systems can be limited, for example, by springs associated with the push-buttons.

SUMMARY

The techniques described here can be used with a wide range of consumer and other electronic devices and can facilitate a user's control of such features as volume, as well as song, channel or page selection, depending on the application.

For example, in one aspect, the present disclosure describes a device that includes a module including a light source operable to emit light out of the device and multiple light detectors. An electronic control unit operable to receive signals from the light detectors, and detect movement of an object (e.g., a user's finger) passing in front of the module outside of the device. The electronic control unit is operable to detect the movement based on light emitted from the module, reflected by the object back toward the module and sensed by the light detectors. The electronic control unit further is operable to control a feature of the device in response to the detected movement.

Some implementations include one or more of the following features. For example, the device can include a speaker operable to generate sound, wherein the electronic control unit is operable to control a volume of the sound generated by the speaker in response to the detected movement of the object. In some instances, the electronic control unit is operable to increase or decrease the volume of the sound depending on a direction of the detected movement of the object. Further, in some implementations, the electronic control unit is operable to increase or decrease the volume of the sound by a specified amount (e.g., percentage) each time the electronic control unit determines that the object passed in front of each of the detectors. The electronic control unit also can be operable to determine how quickly the object passed in front of the light detectors based on the signals from the light detectors and, in response thereto, to increase or decrease the volume of the sound by a specified amount.

In some implementations, the device includes memory to store a playlist of songs, wherein the electronic control unit is operable to select a next or previous item in the playlist in response to the detected movement of the object. In some instances, the electronic control unit is operable to select the next item in the playlist or the previous item in the playlist depending on a direction of the detected movement of the object. Further, in some cases, the electronic control unit is operable to determine how quickly the object passed in front of the light detectors based on the signals from the light detectors and, in response thereto, to increase or decrease a speed of scrolling through the playlist.

In some implementations, the device includes a digital book reader and memory to store an e-book, wherein the electronic control unit is operable to display a next or previous page in the e-book in response to the detected movement of the object. In some instances, the electronic control unit is operable to display the next page in the e-book or the previous page in the e-book depending on a direction of the detected movement of the object. Further, in some cases, the electronic control unit is operable to determine how quickly the object passed in front of the light detectors based on the signals from the light detectors and, in response thereto, to increase or decrease a speed of scrolling through the pages of the e-book.

In some implementations, the device includes a remote control operable for volume control and for channel selection. The module can include multiple light sources and multiple groups of light detectors, wherein the electronic control unit is operable to use signals from a first group of the light detectors for the volume control and to use signals from a second group of the light detectors for channel selection. In some instances, the first and second groups of light detectors are arranged orthogonally with respect to one another. The electronic control unit is operable, in some implementations, to generate a signal indicative of channel selection based at least in part on a direction of the detected movement of the object.

In another aspect, the present disclosure describes a method that includes emitting light out of a module, receiving signals from light detectors in the module, wherein the signals represent, at least in part, light reflected by a person's finger (or other object) passing in front of the light detectors, detecting movement of the person's finger (or other object) based on the received signals, and controlling a feature of a device in response to the detected movement.

Some implementations include one or more of the following features. For example, the method can include controlling a volume of sound generated by the device in response to the detected movement of the user's finger. In some cases, the method includes controlling whether the volume is increased or decreased depending on a direction of the detected movement of the user's finger. Further, in some instances, the method includes determining how quickly the user's finger passed in front of the light detectors based on the signals from the light detectors and, in response thereto, increasing or decreasing the volume of the sound by a specified amount.

In some instances, the subject matter of the present disclosure can help avoid problems associated with mechanical push-buttons. Further, by eliminating the mechanical push-buttons the design-complexity and costs of the device can be reduced, and the life-time of the control interface can be extended. In some instances, manufacturing processes also become simpler, leading to further cost reductions. The techniques describes here can result in devices having a reduced height and smaller overall volume, which can make the techniques especially suitable for small- and ultra-small (wearable) devices.

Other aspects, features and advantages will be readily apparent from the following detailed description, the accompanying drawings, and the claims.

BRIEF DESCRIPTION OF THE DRAWINGS

FIGS. 7A and 7B are timing diagrams of signals from the light detectors.

FIG. 12A shows an example of a remote control device operable for volume control and channel selection.

FIGS. 12B and 12C illustrate various arrangements of an optoelectronic control module for integration into the remote control device of FIG. 12A.

DETAILED DESCRIPTION

Figure 1:
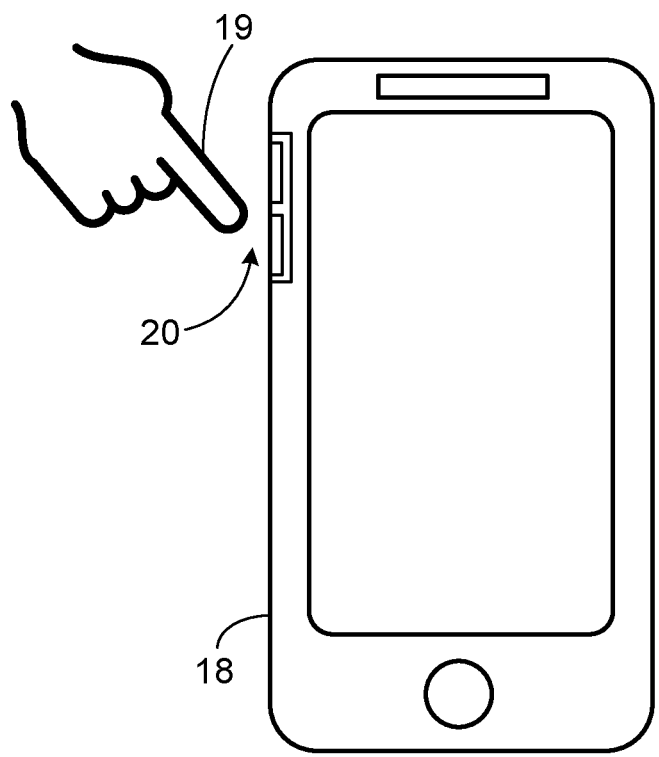
FIG. 1 shows an example of a portable device including an optoelectronic module operable to respond to a user's manual movements for controlling the device.

As shown in FIG. 1, a portable device 18, such as a smart phone, includes a speaker operable to generate audible sounds that can be heard by a user. The speaker can be operable, for example, to translate an electrical signal into an audible sound and may contain an electromagnet. The device 18 includes an optoelectronic volume control module 20 that is responsive, for example, to the movement of a user's finger 19 without the need for the user to touch or otherwise contact the volume control module.

Figure 2:
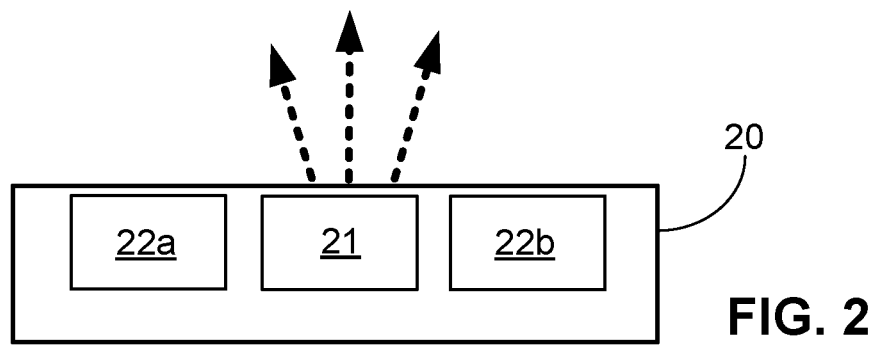
FIG. 2 illustrates an example of an optoelectronic volume control module.
Figure 3:
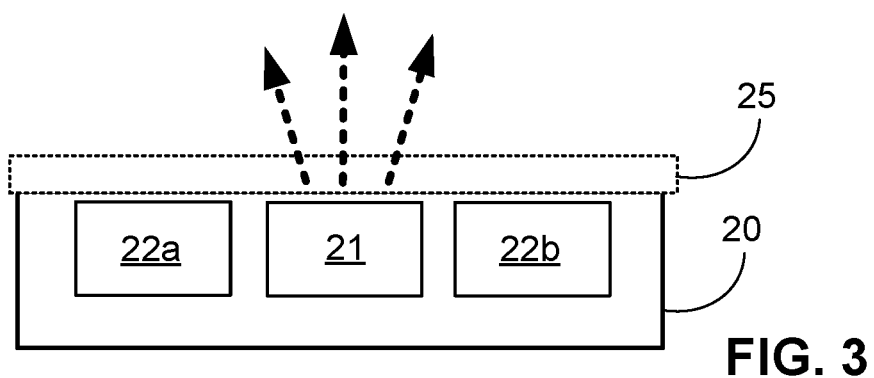
FIG. 3 illustrates another example of an optoelectronic volume control module.

As illustrated in FIG. 2, the volume control module 20 includes a light source 21, such as a light emitting diode (LED), and multiple light detectors 22a, 22b, such as photodiodes. Other type of light sources (e.g., organic LEDs (OLEDs), infra-red (IR) lasers or vertical cavity surface emitting lasers (VCSELs)) can be used in some implementations. Likewise, other types of light detectors can be used in some cases. Depending on the implementation, the light source 21 can be operable to emit light in the infra-red (IR), visible, or ultra-violet (UV) part of the electro-magnetic spectrum. In some instances, the light source 21 is operable to generate a continuous emission; in other cases, the light source 21 is operable to emit light in a pulsed mode, which can be help reduce overall power consumption. The light detectors 22a, 22b are operable to detect light of the wavelength(s) emitted by the light source 21. The module 20 can include a glass or other cover 25 that is transparent to the wavelength(s) of light emitted by the light source 21 to prevent dust, water and moisture from entering the module. As shown in FIG. 3, in some instances, the module 20 is disposed underneath a cover-glass 25 of the host device 18.

Figure 4A:
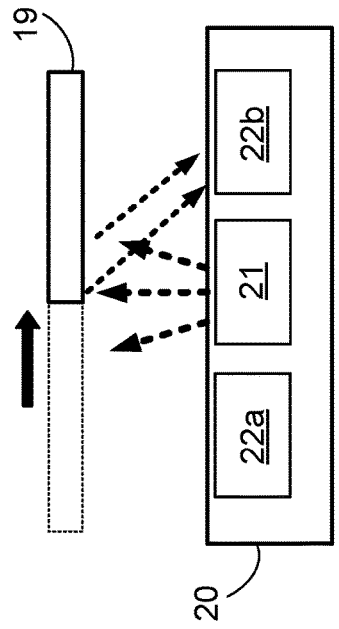
FIGS. 4A and 4B illustrate an object moving across the space in front of the module's light detectors.
Figure 4B:
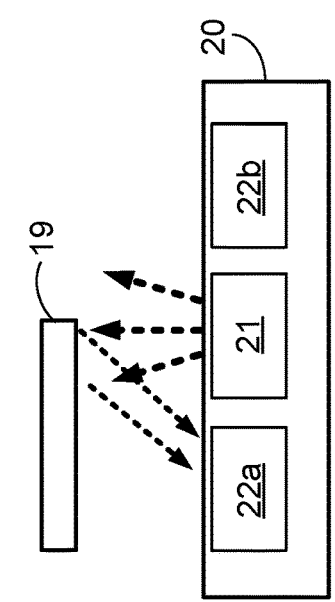

When no target is present adjacent the module so as to intercept and reflect light emitted by the light source 21, the light detectors 22a, 22b do not sense light emitted by the light source. FIGS. 4A and 4B illustrate operation of the module 20 when a user slides her finger slightly above the module while the light source 21 emits light. Thus, when a user's finger, for example, appears on the left side of the module (FIG. 4A), it reflects light emitted by the light source 21. The reflected light is received by the first light detector 22a. As the user's finger moves further to the right side of the module 20, the light signal sensed of the first light detector 22a decreases, whereas the light signal sensed by the second light detector 22b increases.

Figure 5:
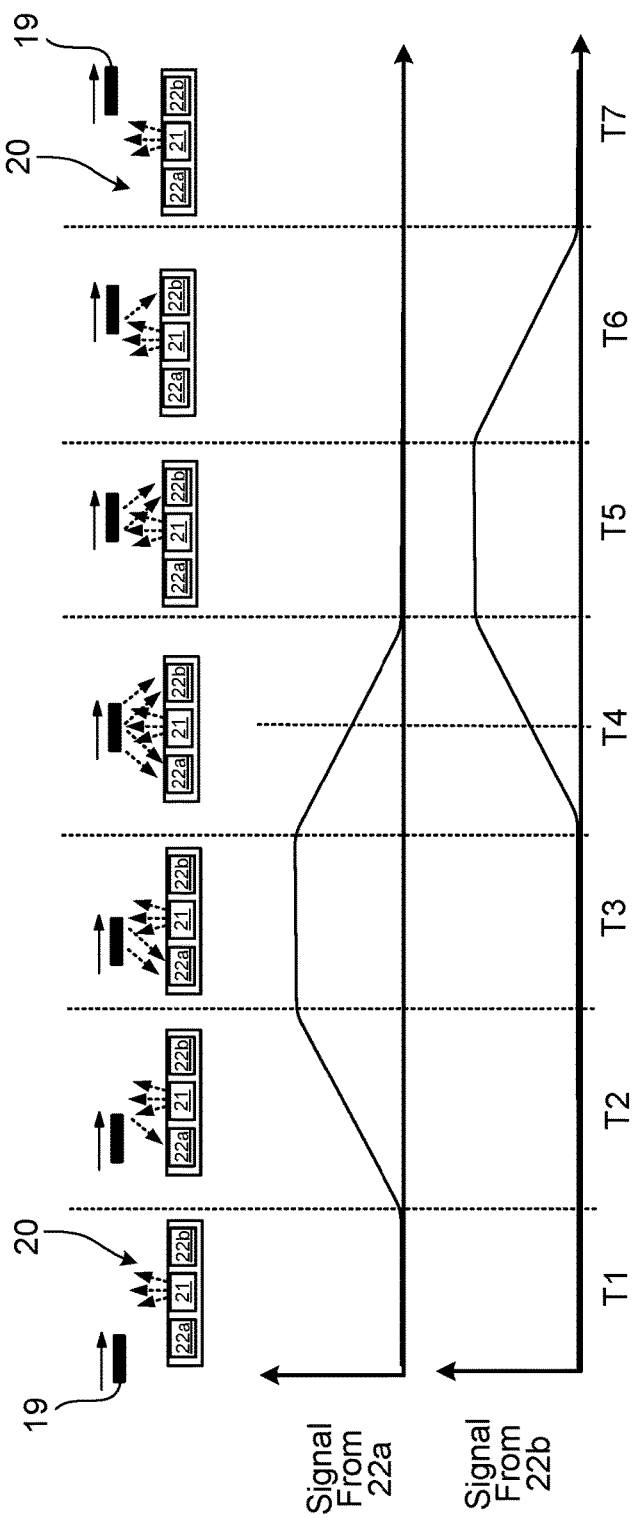
FIG. 5 illustrates further details as an object moves across the space in front of the module's light detectors.

FIG. 5 illustrates further details of the changes sensed by each of the light detectors 22a, 22b as the user's finger 19 moves across the space in front of the light detectors 22a 22b. As long as the user's finger 19 is outside the detection range of the module 20 (at time T1), light emitted by the light source 21 is not reflected by the user's finger to either of the light detectors 22a, 22b. Thus, the signals generated by each of the light detectors 22a, 22b is about zero. As the user's finger 19 moves into the detection area (at time T2), it starts reflecting light toward the first detector 22a, and the signal from the first detector 22a increases. This trend continues until the maximum value of the signal sensed by the first detector 22a is reached (at time T3). As the user's finger 19 moves into the center of the module's detection area (at time T4), light is reflected toward both of the detectors 22a, 22b, each of which generates a respective signal having about the same amplitude as the signal from the other detector. As the user's finger 19 continues moving toward the right (at time T6), the signals from the detectors change such that the signal from the second detector 22b increases and the signal from the first detector 22a decreases. As the user's finger 19 moves outside of the detection range (at time T7), the signals from each of the light detectors 22a, 22b again is about zero.

A finger movement from right-to-left (rather than left-to-right) generates opposite signals in the detectors 22a, 22b over time. Thus, in such cases, the signal from the second detector 22b increases before the signal from the first detector 22a. The signals from the detectors thus can be used to determine whether a user's finger is being moved across the space in front of the light detectors 22a 22b, and, if so, the direction of movement.

Figure 6:
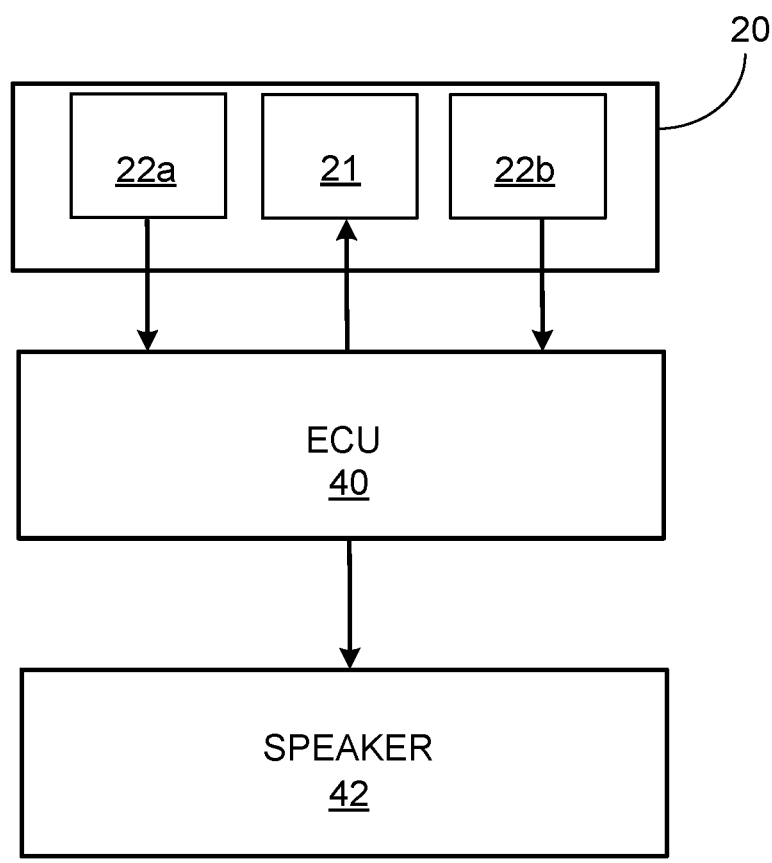
FIG. 6 is a block diagram of a host device including the optoelectronic control module.

As shown in FIG. 6, the output signals from the light detectors 22a, 22b are provided to an electronic control unit (ECU) 40 in the module itself or in the host device. The ECU 40 is operable to process the signals and analyzes them to determine whether a user's finger (or other object) is being moved across the space in front of the light detectors 22a 22b, and, if so, the direction of movement. In response to detecting that a user's finger 19 (or other object) has moved across the space in front of the light detectors 22a, 22b as described above, the ECU 40 adjusts the volume level of the host device's speaker 42 or other sound generator. For example, if the ECU 40 detects movement of a user's finger from left-to-right, it can increase the sound level by a predetermined amount (e.g., 10%), whereas if the ECU 40 detects movement of a user's finger from right-to-left, it can decrease the sound level by a predetermined amount (e.g., 10%). If the user wants to increase or decrease the volume further, she would move her finger across the space in front of the light detectors 22a 22b one or more times (e.g., from left-to-right to increase the volume or from right-to-left to decrease the volume).

In general, the user's finger preferably should remain at approximately the same height above the module 20 as the user slides her finger in front of the light detectors 22a, 22b. In the foregoing description, movement of the user's finger is described as left-to-right (to increase the volume) or right-to-left (to decrease the volume). In some implementations, a left-to-right movement may be used to reduce the volume, and a right-to-left movement can be used to increase the volume. Also, in some cases, the user's finger may be described as moving up and down (rather than right and left) depending, for example, on the orientation of the host device 18.

In some implementations, the ECU 40 is operable to determine the speed at which the user moves her finger 19 across the space in front of the module 20 and to increase or decrease the volume in proportion to the measured speed. Thus, for example, if the ECU detects a slower speed, it would increase or decrease the volume by a first amount (e.g., 10%), whereas if the ECU detects a higher speed, it would increase or decrease the volume by a second amount (e.g., 20%) that is greater than the first amount. The ECU 40 can measure the speed of movement, for example, by determining the time difference between the peak signals detected by the light detectors 22a, 22b during a particular timeframe. A relatively short time (t") between the peaks indicates relatively quick movement of the user's finger across the space in front of the module 20, whereas a longer time (t') between the peaks indicates a slower movement of the user's finger (FIGS. 7A and 7B). Using the foregoing techniques, the module 20 and the ECU 40 can be used to control not only whether the volume of the device 18 is increased or decreased, but also how quickly the volume is increased or decreased.

Figure 8:
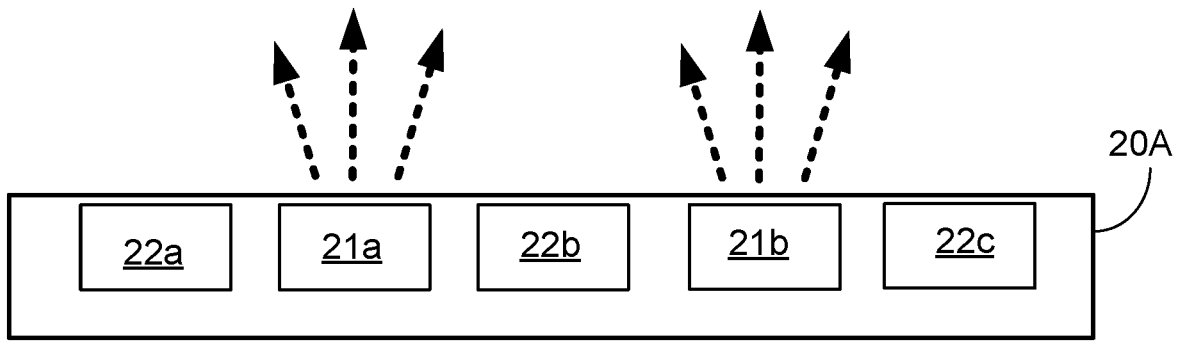
FIG. 8 illustrates another implementation of optoelectronic volume control module.

To increase accuracy and sensitivity, additional light source and/or light detectors can be provided in the module. For example, FIG. 8 illustrates an example module 20A that has two light sources (21a, 21b) and three light detectors (22a, 22b, 22c). In this case, a finger (or other object) moving from left to right across the space in front of the light detectors 22a, 22b, 22c would generate a signal in the first detector 22a, then in the second detector 22b, and then in the third detector 22c. In a manner similar to that described above, the ECU 40 can use the signals from the detectors 22a, 22b, 22c to determine the direction and speed of movement of the user's finger and, in response, adjust the volume (increase/decrease the volume quickly/slowly).

Figure 9A:
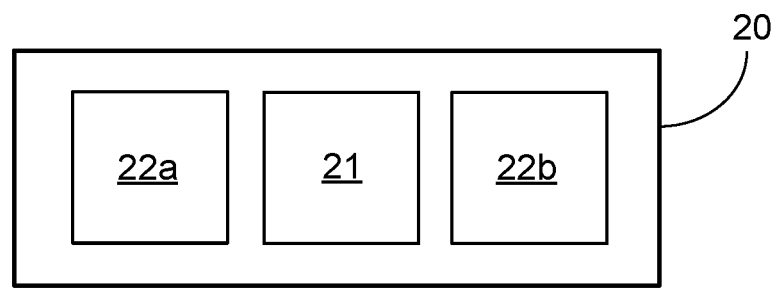
FIG. 9A and 9B illustrate examples of top views of a volume control module.
Figure 9B:
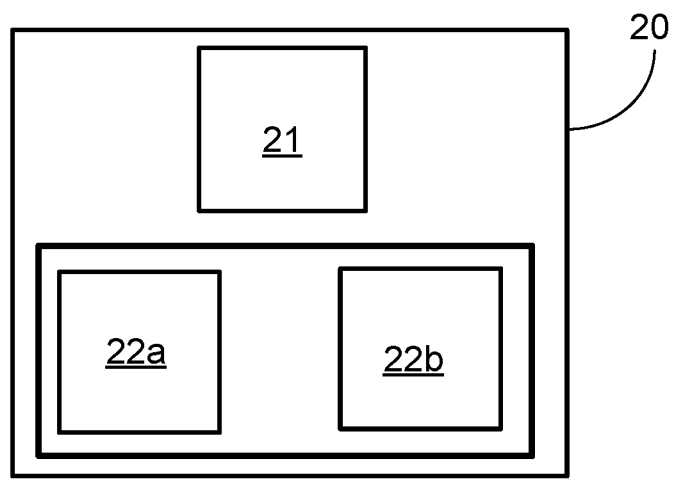

FIGS. 9A and 9B illustrate various arrangements of the light source 21 and light detectors 22a, 22b. The components can be arranged, for example, along one line as shown in FIG. 9A. In other cases, the components are arranged in an asymmetric geometry as shown in FIG. 9B. This latter arrangement can be particularly suitable if both the light source 21 and the light detectors 22a, 22b are on the same ASIC.

Various techniques can be used to help reduce optical noise (e.g., background noise from the environment). For example, the light source 21 can be selected such that the wavelength(s) of light it emits are present only at relatively low levels in the environment of interest (e.g. infrared light). In some instances, an optical element is provided in front of the light source to produce a very narrow beam. Likewise, in some cases, respective optical elements are provided in front of the light detectors 22a, 22b to help exclude optical noise from the environment.

Further, in some implementations, the light source 21 is operated in a high pulse width modulation mode to detect changes in optical noise. The measurements of optical noise then can be used for measurements of finger movement. For example, while the light source 21 is off (i.e., not emitting light), the ECU 40 can measure the optical noise based on the output signals from the detectors 22a, 22b. The noise then can be subtracted from the measurements made when the light source is on (i.e., emitting a pulse of light) in the presence of a user's finger moving across the space in front of the light detectors 22a, 22b.

Figure 10A:
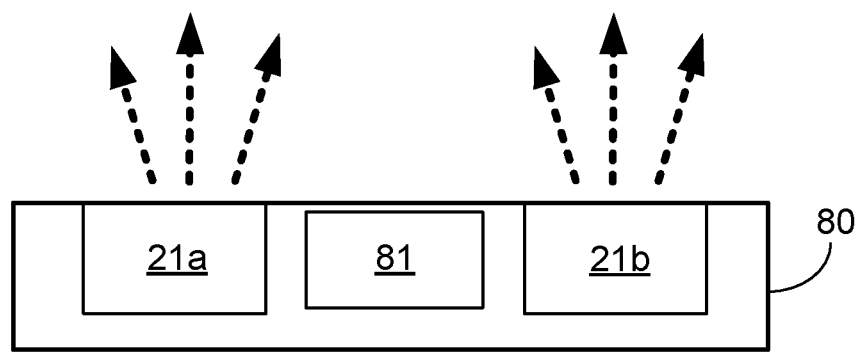
FIGS. 10A and 10B illustrate examples of a volume control module operable to emit light of different colors or having color filters for different detectors.
Figure 10B:
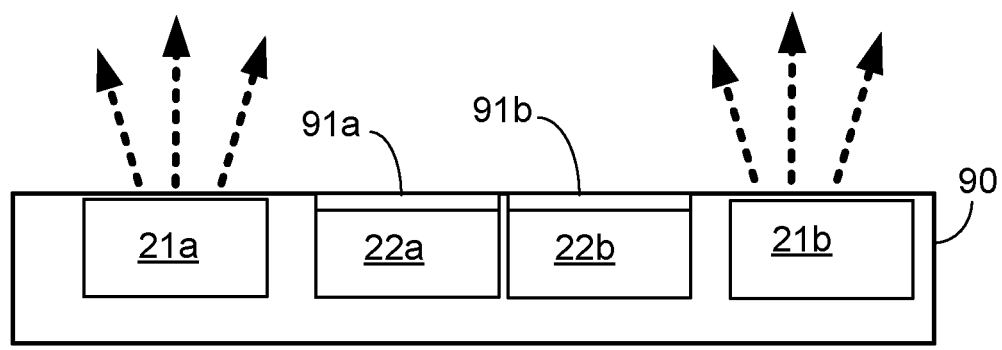

Reducing the affects of optical noise also can be accomplished or further optimized by providing the module with multiple light sources (21a, 22b) that emit light at different respective wavelengths, and a color-sensor 81 disposed between the light sources (see FIG. 10A) For example, one light source 21a can be operable to emit near-IR light, whereas the other light source 21b can be operable to emit UV light. The light reflected by the user's finger then shifts from one wavelength to the other as the user moves her finger across the space in front of the module. In other instances, as shown in FIG. 10B, the module includes multiple centered light detectors 22a, 22b that have different respective color filters 91a, 91b corresponding to the wavelength(s) of light emitted by the light sources 21a, 21b.

Figure 11:
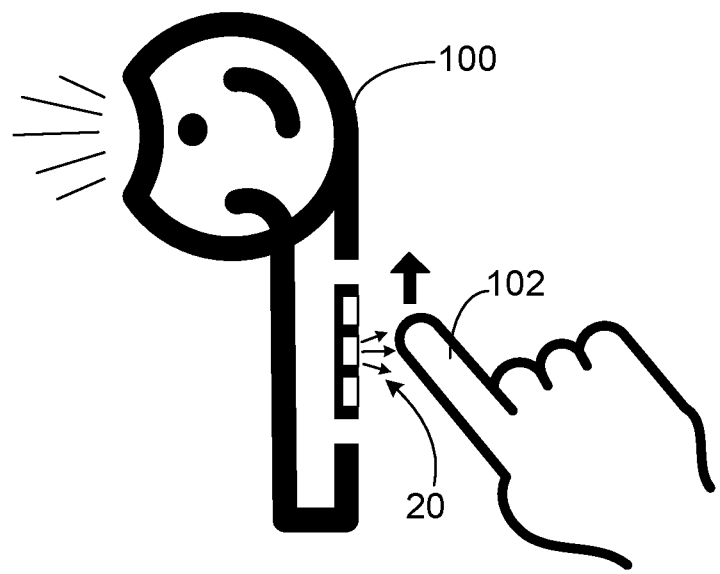
FIG. 11 illustrates an example of the optoelectronic volume control module in a in-ear headphone.

Volume control can be used in a variety of consumer devices including, e.g., smart phones and other mobile phones, personal computers, tablet computers, laptop computers, tv remote controls, radios, wearables such as e-watches, and in-ear headphones. FIG. 11 illustrates an example of the module 20 integrated into an in-ear headphone 100. A user can move her finger 102 in front of the light detectors in the module 20 in the manner described above to control the volume.

The modules described above also can be used to control features of other portable electronic devices. For example, the module can be integrated in a portable music playing device. A user can move her finger in front of the light detectors in the module in the manner described above to cause the device to play the next (or previous) song in a playlist stored in memory in the music playing device. The ECU 40 can be programmed so that faster movement of the user's finger causes faster scrolling through the playlist.

Similarly, the module can be integrated in a digital book reader including memory that stores an e-book. A user can move her finger in front of the light detectors in the module in the manner described above to cause the device to display the next (or previous) page in the book reader. Here too, the ECU 40 can be programmed so that faster movement of the user's finger causes faster scrolling through the e-book.

The foregoing modules also can be used for channel selection in a tv remote control device. A user can move her finger in front of the light detectors in the module in the manner described above to cause the remote control device to generate one or more signals that cause a tv to display the next (or previous) channel. Here too, the ECU 40 can be programmed so that faster movement of the user's finger causes faster scrolling through the channels.

As shown in FIGS. 12A, 12B and 12C, the foregoing techniques can be modified to facilitate both volume control and channel selection in the same remote control device 200. In this case, the optoelectronic module 202 includes first and second light sources 61a, 61b each of which has a respective light filter. For example, the first light source 61a can be operable to emit red or IR light, and the second light source 61b can be operable to emit green light. A first pair of light detectors 62a, 62b (aligned along the horizontal axis in FIG. 12B) can have a red or infrared (IR) light filter, and a second pair of light detectors 62c, 62d (aligned along the vertical axis in FIG. 12B) can have a green light filter.

As shown in FIG. 12C, instead of different wavelengths for the respective light sources and corresponding light detectors, differently polarized light and polarized filters can be used. Thus, for example, the module 202A includes a first light source 71a operable to emit light having a first polarization, and a second light source 61b operable to emit light having a second different polarization. A first pair of light detectors 72a, 72b (aligned along the horizontal axis in FIG. 12C) can have filters such that they are operable selectively to detect light of the first polarization, and a second pair of light detectors 72c, 72d (aligned along the vertical axis in FIG. 12C) can have filters such that they are operable selectively to detect light of the second polarization.

The arrangements of FIGS. 12B and 12C can help avoid confusion between the horizontally-oriented and vertically-oriented pairs of detectors (i.e., those used for volume control and those used for channel selection). In some instances, the modules of FIG. 12B (or 12C) also is responsive to a user's tapping her finger one or more times in the center region 204 (e.g., directly over the emitters 61a, 61b). In such cases, the signals from the detectors (e.g., 62a, 62b or 62c, 62d) increases at about the same time. Based on this information, the ECU 40 can be programmed to detect one or more finger taps by the user and, in some instances, also can detect how quickly multiple taps occurred.

Various aspects of the subject matter and the functional operations described in this specification can be implemented in digital electronic circuitry, or in computer software, firmware, or hardware, including the structures disclosed in this specification and their structural equivalents, or in combinations of one or more of them. Aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus" and "computer" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, app or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a smart phone or other mobile telephone, a personal digital assistant (PDA), a mobile audio player, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Various modifications can be made and will be apparent from the foregoing description. Further, in some cases, features described in connection with different implementations can be combined in the same implementation. Thus, other implementations are within the scope of the claims.

What is claimed is:
1. A device comprising:
a module including:
a light source operable to emit light out of the device, and
a plurality of light detectors, and
wherein a light-emitting surface of the light source and a light-receiving surface of the plurality of light detectors are laterally arranged in the same plane;
an electronic control unit operable to:
receive signals from the light detectors, and
detect movement of an object passing in front of the module outside of the device,
wherein the electronic control unit is operable to detect the movement based on light emitted from the mod- ule, reflected by the object back toward the module and sensed by the light detectors, wherein the electronic control unit further is operable to control a feature of the device in response to the detected movement.

2. The device of claim 1, further including a speaker operable to generate sound, wherein the electronic control unit is operable to control a volume of the sound generated by the speaker in response to the detected movement of the object.

3. The device of claim 2, wherein the electronic control unit is operable to increase or decrease the volume of the sound depending on a direction of the detected movement of the obj ect.

4. The device of claim 2, wherein the electronic control unit is operable to increase or decrease the volume of the sound by a specified amount each time the electronic control unit determines that the object passed in front of each of the detectors.

5. The device of claim 4, wherein the electronic control unit is operable to increase or decrease the volume of the sound by a specified percentage amount each time the electronic control unit determines that the object passed in front of the detectors.

6. The device of claim 2, wherein the electronic control unit is operable to determine how quickly the object passed in front of the light detectors based on the signals from the light detectors and, in response thereto, to increase or decrease the volume of the sound by a specified amount.

7. The device of claim 1, wherein the light source is operable in a pulsed mode.

8. The device of claim 1, further including memory to store a playlist of songs, wherein the electronic control unit is operable to select a next or previous item in the playlist in response to the detected movement of the object.

9. The device of claim 8, wherein the electronic control unit is operable to select the next item in the playlist or the previous item in the playlist depending on a direction of the detected movement of the object.

10. The device of claim 9, wherein the electronic control unit is operable to determine how quickly the object passed in front of the light detectors based on the signals from the light detectors and, in response thereto, to increase or decrease a speed of scrolling through the playlist.

11. The device of claim 1, further including a digital book reader and memory to store an e-book, wherein the electronic control unit is operable to display a next or previous page in the e-book in response to the detected movement of the object.

12. The device of claim 11 wherein the electronic control unit is operable to display the next page in the e-book or the previous page in the e-book depending on a direction of the detected movement of the object.

13. The device of claim 12, wherein the electronic control unit is operable to determine how quickly the object passed in front of the light detectors based on the signals from the light detectors and, in response thereto, to increase or decrease a speed of scrolling through the pages of the e-book.

14. The device of claim 1, including a remote control operable for volume control and for channel selection, wherein the module include a plurality of light sources and a plurality of groups of light detectors, wherein the electronic control unit is operable to use signals from a first group of the light detectors for the volume control and to use signals from a second group of the light detectors for channel selection.

15. The device of claim 14, wherein the first and second groups of light detectors are arranged orthogonally with respect to one another.

16. The device of claim 14, wherein the electronic control unit is operable to generate a signal indicative of channel selection based at least in part on a direction of the detected movement of the object.

17. A method comprising:
emitting light out of a module;
receiving signals from light detectors in the module, wherein the signals represent, at least in part, light reflected by a person's finger passing in front of the light detectors, wherein a light-receiving surface of the plurality of light detectors are laterally arranged in the same plane;
detecting movement of the person's finger based on the received signals; and
controlling a feature of a device in response to the detected movement.

18. The method of claim 17, including controlling a volume of sound generated by the device in response to the detected movement of the user's finger.

19. The method of claim 18, including controlling whether the volume is increased or decreased depending on a direction of the detected movement of the user's finger.

20. The method of claim 19, including determining how quickly the user's finger passed in front of the light detectors based on the signals from the light detectors and, in response thereto, increasing or decreasing the volume of the sound by a specified amount.

* * * * *

UNITED STATES PATENT AND TRADEMARK OFFICE
CERTIFICATE OF CORRECTION

| | |
|---|---|
| PATENT NO. | : 11,537,217 B2 |
| APPLICATION NO. | : 17/419948 |
| DATED | : December 27, 2022 |
| INVENTOR(S) | : Laurent Nevou et al. |

It is certified that error appears in the above-identified patent and that said Letters Patent is hereby corrected as shown below:

In the Claims

Column 9, Line 14; Claim 3; Please change "the obj ect" to -- the object --

Signed and Sealed this
Twenty-first Day of February, 2023

*Katherine Kelly Vidal*

Katherine Kelly Vidal
*Director of the United States Patent and Trademark Office*